US012416702B2

(12) United States Patent
Oh et al.

(10) Patent No.: US 12,416,702 B2
(45) Date of Patent: Sep. 16, 2025

(54) MULTILATERATION SYSTEM BASED ON ABSOLUTE DISTANCE MEASUREMENT AND MULTILATERATION METHOD USING THE SAME

(71) Applicant: KOREA INSTITUTE OF MACHINERY & MATERIALS, Daejeon (KR)

(72) Inventors: Jeong Seok Oh, Daejeon (KR); Seungman Kim, Daejeon (KR); Seongheum Han, Daejeon (KR); Gyungho Khim, Daejeon (KR); Seung Kook Ro, Daejeon (KR); Quoc Khanh Nguyen, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 483 days.

(21) Appl. No.: 17/523,147

(22) Filed: Nov. 10, 2021

(65) Prior Publication Data
US 2022/0390544 A1    Dec. 8, 2022

(30) Foreign Application Priority Data
May 31, 2021 (KR) .................. 10-2021-0069708

(51) Int. Cl.
*H04W 24/00* (2009.01)
*G01C 21/16* (2006.01)
(Continued)

(52) U.S. Cl.
CPC .......... *G01S 5/0284* (2013.01); *G01C 21/165* (2013.01); *G01S 19/49* (2013.01)

(58) Field of Classification Search
CPC .......... G01S 5/0284; G01S 5/021; G01S 5/14; G01S 17/42; G01S 17/66; G01S 19/49;
(Continued)

(56) References Cited

U.S. PATENT DOCUMENTS 5,479,712 A * 1/1996 Hargrove ................ F41G 1/473
33/262
5,583,517 A * 12/1996 Yokev ..................... G01S 1/026
342/465
(Continued)

FOREIGN PATENT DOCUMENTS

| CN | 1240270 A | 1/2000 |
|---|---|---|
| JP | 6540882 B2 | 7/2019 |
| KR | 10-1991094 B1 | 6/2019 |

OTHER PUBLICATIONS

Seungman Kim et al., "3D Coordinate Measurement System Based on Multiple Absolute Distances for Mobile Machining Platform", Journal of the Korea Society of Manufacturing Technology Engineers, 2017, pp. 632-638, along with an English Abstract.
(Continued)

Primary Examiner — Stephen M D Agosta
(74) Attorney, Agent, or Firm — Hauptman Ham, LLP

(57) ABSTRACT

In a multilateration system based on an absolute distance measurement and a multilateration method using the multilateration system, the multilateration system is configured to obtain spatial coordinates of an object moving in a space. The system includes a tracking unit having a plurality of tracking devices, and a control calculation part having a dead path estimation part and a tracking device position calculation part. The tracking devices are positioned differently with each other and each of the tracking devices measures a distance to the object. The dead path estimation part is configured to pre-estimate a dead path which is a distance between a measurement reference surface of each
(Continued)

tracking device and a central position of each tracking device. The tracking device position calculation part is configured to calculate the central position of each tracking device via nonlinear optimization.

12 Claims, 10 Drawing Sheets

(51) Int. Cl.
  *G01S 5/02* (2010.01)
  *G01S 19/49* (2010.01)
(58) Field of Classification Search
  CPC .... G01C 21/165; G01B 11/03; G01B 11/026; G01B 21/045
  See application file for complete search history.

(56) References Cited

U.S. PATENT DOCUMENTS

| | | | | |
|---|---|---|---|---|
| 6,480,271 | B1* | 11/2002 | Cloud | G01C 25/00 356/152.1 |
| 7,933,572 | B1* | 4/2011 | Johnson | H04N 7/10 725/111 |
| 8,164,514 | B1* | 4/2012 | Yang | G01S 5/0273 342/357.28 |
| 8,990,043 | B1* | 3/2015 | Kolodziej | G01C 5/06 702/150 |
| 9,784,837 | B1* | 10/2017 | Olsson | G01S 3/7862 |
| 2003/0158650 | A1* | 8/2003 | Abe | G08G 1/005 701/420 |
| 2003/0208314 | A1* | 11/2003 | Funk | G01C 21/3688 701/500 |
| 2005/0080520 | A1* | 4/2005 | Kline | B65F 1/0006 701/1 |
| 2007/0139266 | A1* | 6/2007 | Outwater | H01Q 1/1257 342/359 |
| 2008/0018475 | A1* | 1/2008 | Breed | G06K 7/0008 340/572.7 |
| 2009/0047023 | A1* | 2/2009 | Pescod | H04B 10/25753 398/115 |
| 2009/0326809 | A1* | 12/2009 | Colley | G01S 19/13 701/446 |
| 2010/0039320 | A1* | 2/2010 | Boyer | G01S 19/46 342/357.29 |
| 2010/0226210 | A1* | 9/2010 | Kordis | G01S 5/22 367/127 |
| 2011/0006981 | A1* | 1/2011 | Chtchetinine | G06F 3/0428 345/157 |
| 2011/0105184 | A1* | 5/2011 | Piirainen | H04W 24/02 455/562.1 |
| 2011/0137558 | A1* | 6/2011 | Lu | G01C 21/30 701/532 |
| 2012/0007804 | A1* | 1/2012 | Morrison | G06F 3/0425 345/158 |
| 2012/0147183 | A1* | 6/2012 | Nishimura | G02B 13/06 348/143 |
| 2012/0281565 | A1* | 11/2012 | Sauer | H04W 64/00 370/252 |
| 2012/0329523 | A1* | 12/2012 | Stewart | H04B 1/525 455/562.1 |
| 2013/0197793 | A1* | 8/2013 | Vaddadi | G01S 7/4004 701/300 |
| 2013/0201100 | A1* | 8/2013 | Mcgibney | G06F 3/0416 345/156 |
| 2014/0313321 | A1* | 10/2014 | Olsson | G01S 19/485 348/135 |
| 2015/0204652 | A1* | 7/2015 | Olsson | G01J 3/0262 356/614 |
| 2016/0370177 | A1* | 12/2016 | Laine | G01B 11/16 |
| 2018/0097659 | A1* | 4/2018 | Hanson | H04L 49/351 |
| 2018/0151060 | A1* | 5/2018 | Griffin | H04N 21/414 |
| 2018/0231668 | A1* | 8/2018 | Xia | G01S 5/14 |
| 2018/0348749 | A1* | 12/2018 | Lavoie | G06V 20/10 |
| 2018/0351727 | A1* | 12/2018 | Hoffmann | H04W 28/085 |
| 2019/0056483 | A1* | 2/2019 | Bradley | G01S 7/4815 |
| 2019/0063925 | A1* | 2/2019 | Barbier | G01C 21/28 |
| 2019/0102911 | A1* | 4/2019 | Natroshvili | B60R 1/00 |
| 2019/0170521 | A1* | 6/2019 | Elhoushi | G01C 21/20 |
| 2019/0212434 | A1* | 7/2019 | Ding | G01S 5/0284 |
| 2019/0212760 | A1* | 7/2019 | Tiwari | G05D 23/27543 |
| 2019/0293806 | A1* | 9/2019 | Haley | H04W 4/02 |
| 2019/0297595 | A1* | 9/2019 | Sirotkin | H04W 8/02 |
| 2020/0025944 | A1* | 1/2020 | Mellier | G01S 19/48 |
| 2020/0357704 | A1* | 11/2020 | Schaefer | G01B 11/0616 |
| 2020/0400787 | A1* | 12/2020 | Tsukamoto | G01S 7/4814 |
| 2021/0029564 | A1* | 1/2021 | Lupper | H04W 24/08 |
| 2021/0033383 | A1* | 2/2021 | Zhu | G01B 9/02027 |
| 2021/0124033 | A1* | 4/2021 | Ziegler | G01S 13/931 |
| 2022/0069876 | A1* | 3/2022 | Xue | H04B 7/0617 |
| 2022/0141776 | A1* | 5/2022 | Diamond | H04W 36/32 455/522 |
| 2023/0396506 | A1* | 12/2023 | Wang | H04L 41/145 |

OTHER PUBLICATIONS

[Supportive material for Exception to Loss of Novelty] Quoc Khanh Nguyen et al., "Improved Self-Calibration of a Multilateration System Based on Absolute Distance Measurement", Sensors, Dec. 18, 2020, 20, 7288.

Hanqi Zhuang et al., "Self-calibration and mirror center offset elimination of a multi-beam laser tracking system", Robotics and Autonomous Systems 9, 1992, pp. 255-269, cited in the Specification.

* cited by examiner

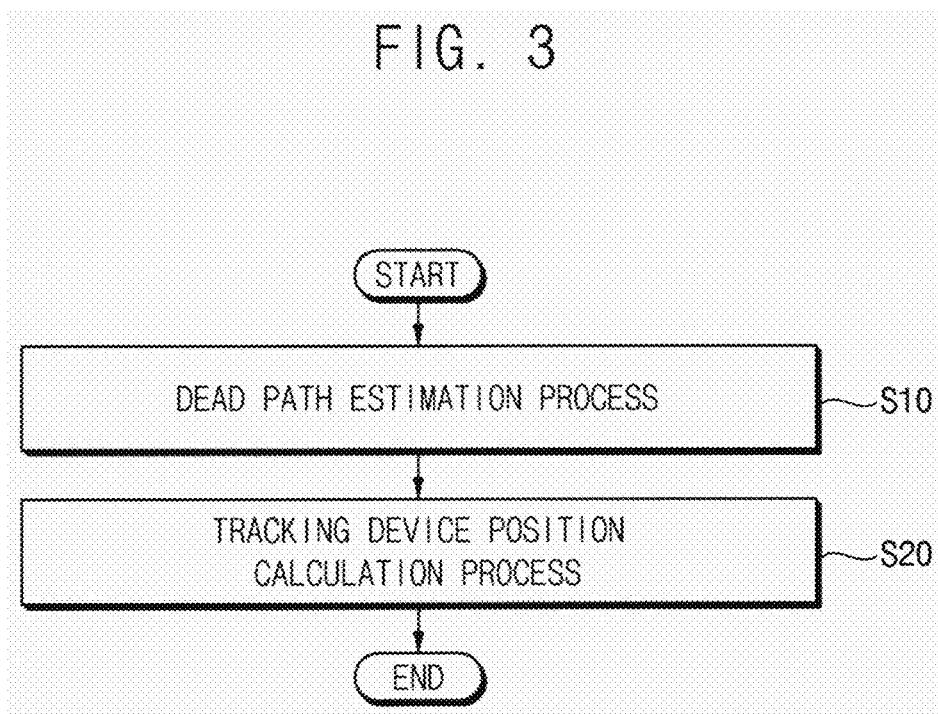

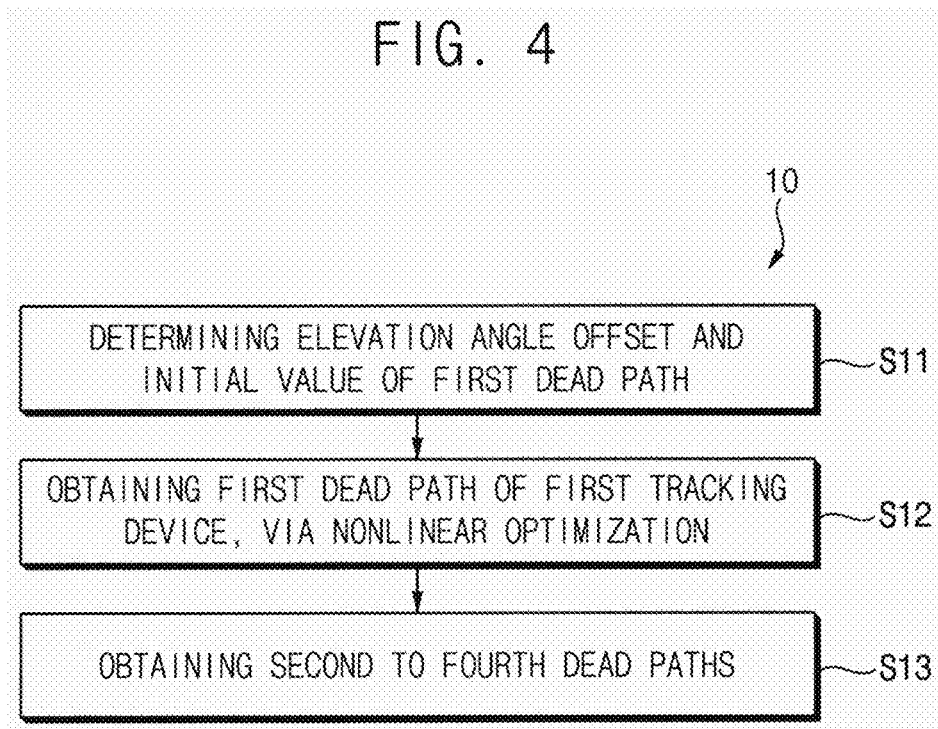
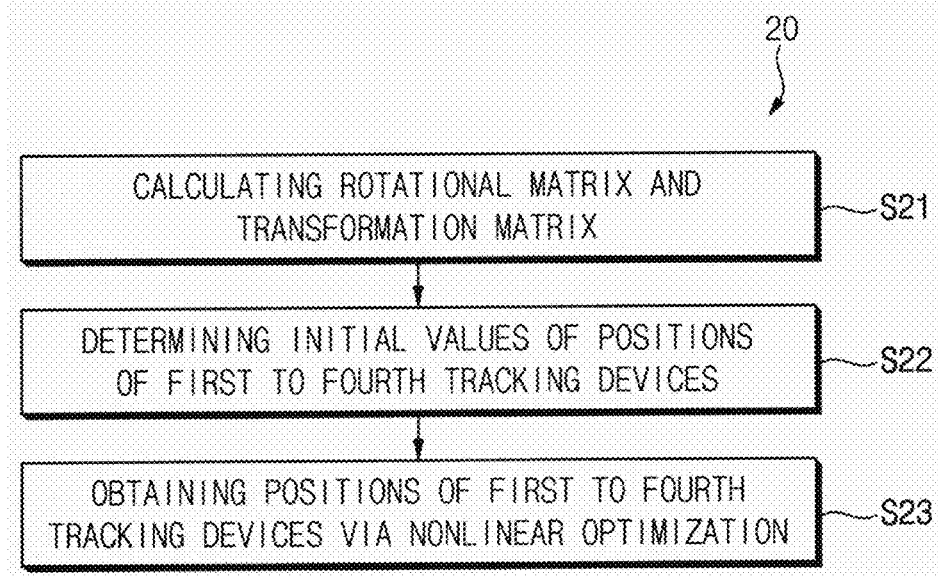

MULTILATERATION SYSTEM BASED ON ABSOLUTE DISTANCE MEASUREMENT AND MULTILATERATION METHOD USING THE SAME

PRIORITY STATEMENT

This application claims priority under 35 U.S.C. § 119 to Korean Patent Application No. 10-2021-0069708, filed on May 31, 2021 in the Korean Intellectual Property Office (KIPO), the contents of which are herein incorporated by reference in their entireties.

BACKGROUND

1. Technical Field

Example embodiments relate to a multilateration system based on an absolute distance measurement and a multilateration method using the same. More particularly, example embodiments relate to a multilateration system based on an absolute distance measurement and a multilateration method using the same, capable of obtaining coordinates of an object by self-calibration based on an absolute distance measured by using the absolute distance measurement system, in the multilateration system obtaining three-dimensional coordinates of the object by using a distance information from a fixing position to the object.

2. Description of the Related Art

Various kinds of technologies related to obtaining coordinates of an object positioned in the space, have been developed to meet the needs required in various kinds of technical fields including an industrial robot field.

Conventionally, in the above technologies, the technology in which the information on the distance of the object and the information of two angles on the object are obtained by using a laser tracker is normally applied.

However, in the above technology in which the distance information and the angle information are both used, an error increases as a measuring range increases due to angle information resolution limit, and thus measurement accuracy is decreased.

Thus, recently, instead of obtaining the angle information, the technology in which the spatial coordinates of the object is obtained by only using the distance information from at least four fixed positions to the object, has been developed.

However, in case that the distance information to the object is only used, system parameters such as a central coordinate, an initial length and so on of a tracking device should be estimated at the same time using a self-calibration algorithm in a relative distance measurement method. However, the above estimation performed at the same time may be inaccurate. In addition, initial values of the system parameters are necessary to obtain an optimal solution but any systematic method has not been presented for determining the initial values, and thus convergence failure or local minimum may occur in the optimization process.

Related prior art is Korean patent No. 10-1991094.

SUMMARY

The present invention is developed to solve the above-mentioned problems of the related arts.

The present invention provides a multilateration system based on an absolute distance measurement, capable of estimating coordinates of an object more accurately by performing self-calibration based on an absolute distance measured by using an absolute distance measurement system and capable of performing optimization more accurately by applying more systemized method in obtaining an optimal solution.

In addition, the present invention also provides a multilateration method using the multilateration system.

According to an example embodiment, the multilateration system is configured to obtain spatial coordinates of an object moving in a space. The multilateration system includes a tracking unit having a plurality of tracking devices, and a control calculation part having a dead path estimation part and a tracking device position calculation part. The tracking devices are positioned differently with each other and each of the tracking devices measures a distance to the object by using an absolute distance measurement system. The dead path estimation part is configured to pre-estimate a dead path which is a distance between a measurement reference surface of each tracking device and a central position of each tracking device. The tracking device position calculation part is configured to calculate the central position of each tracking device via nonlinear optimization.

In an example, the dead path estimation part may be configured to determine an elevation angle offset and an initial value of the dead path for each tracking device, and the dead estimation part may be configured to obtain the dead path of each tracking device via the nonlinear optimization.

In an example, the tracking device position calculation part may be configured to obtain the central position of each tracking device via the nonlinear optimization, based on an initial value of a position of each tracking device.

In an example, the tracking devices may be at least four.

According to another example embodiment, a multilateration method uses a tracking unit having a plurality of tracking devices, and the tracking devices are positioned differently with each other and each of the tracking devices measures a distance to the object by using an absolute distance measurement system. The method includes a dead path estimation process (step S10), and a tracking device position calculation process (step S20). In the step S10, a dead path which is a distance between a measurement reference surface of each tracking device and a central position of each tracking device is pre-estimated. In the step S20, the central position of each tracking device is calculated via nonlinear optimization.

In an example, in the dead path estimation process, a reference coordination system configured to provide reference coordinates information may be used.

In an example, the dead path estimation process may include determining an elevation angle offset and an initial value of a first dead path for a first tracking device (step S11), obtaining the first dead path of the first tracking device, via the nonlinear optimization (step S12), and respectively obtaining dead paths of remaining tracking devices except for the first tracking device (step S13).

In an example, in the step S11, the elevation angle offset of the first tracking device $E_1$ and the initial value of the first dead path $d_{1\_ini}$ may be determined to minimize a residual function $R_{ele1}$ of Equation 1, $$R_{ele1} = \sum_{j=1}^{n-1} \varepsilon_{ele1\_j}^2 = \qquad \text{[Equation 1]}$$

-continued $$\sum_{j=1}^{n-1}\left[\left((x_j-x_{j+1})^2+(y_j-y_{j+1})^2+(z_j-z_{j+1})^2\right)^{-\frac{1}{2}}-l_{ref\_j}\right]^2$$

here, n may be the number of reference positions, $l_{ref\_j}$ is a distance between two positions $P_j(x_j, y_j, z_j)$ and $P_{j+1}(x_{j+1}, y_{j+1}, z_{j+1})$ which is provided in the reference coordination system, $x_j$, $y_j$ and $z_j$ may be defined by Equations 2 to 4 in a local coordinate system of the first tracking device, $$x_j=(l_{1j}+d_{1\_ini})\times\sin(\Theta_{1j}+E_1)\times\cos(\phi_{1j}) \quad \text{[Equation 2]}$$

$$y_j=(l_{1j}+d_{1\_ini})\times\sin(\Theta_{1j}+E_1)\times\sin(\phi_{1j}) \quad \text{[Equation 3]}$$

$$z_j=(l_{1j}+d_{1\_ini})\times\cos(\Theta_{1j}+E_1) \quad \text{[Equation 4]}$$

here, $l_{1j}$ may be an absolute distance measuring the reference position $P_j$ of the reference coordination system at the first tracking device, $\theta_{1j}$ may be a measured elevation angle, and $\phi_{1j}$ may be a measured azimuth angle.

In an example, in the step S12, the first dead path $d_1$ of the first tracking device is obtained to minimize a residual function $R_1$ of Equation 5, $$R_1 = \sum_{j=1}^{n}\varepsilon_{d1\_j}^2 = \quad \text{[Equation 5]}$$

$$\sum_{j=1}^{n}\left[\left((x_j-X_1)^2+(y_j-Y_1)^2+(z_j-Z_1)^2\right)^{-\frac{1}{2}}-(d_1+l_{1j})\right]^2$$

here, $$\sum_{j=1}^{n}\varepsilon_{d1\_j}^2$$

may be the sum of squared errors, $x_j$, $y_j$ and $z_j$ may be the coordinates of the reference position $P_j$ provided in the reference coordination system, $X_j$, $Y_j$ and $Z_j$ may be the coordinates of the center of the first tracking device which is defined with respect to the reference coordination system, and $(d_1+l_{1j})$ may be an actual measured distance by using the first tracking device with respect to the distance to the reference position $P_j$ of the reference coordination system.

In an example, the tracking device position calculation process may include calculating a rotational matrix and a transformation matrix among the first to fourth tracking devices (step S21), determining initial values of the positions of the first to fourth tracking devices (step S22), and obtaining the positions of the first to fourth tracking devices via the nonlinear optimization (step S23).

In an example, in the step S21, the rotational matrix and the transformation matrix may be calculated to minimize a residual function $R_{trans}$ of Equation 6, $$R_{trans} = \sum_{j=1}^{n}\left\|(Rp_j+T)-q_j\right\|^2 \quad \text{[Equation 6]}$$

here, $q_j$ may be a local coordinates of the first tracking device, and $p_j$ may be local coordinates of the remaining tracking devices.

In an example, in the step S22, the coordinates of the first tracking device may be transformed to be an origin (0, 0, 0), the coordinates of the second tracking device may be transformed to be on the X axis $(X_2, 0, 0)$, the coordinates of the third tracking device may be transformed to be on the X-Y plane $(X_3, Y_3, 0)$, and the coordinates of the fourth tracking device may be transformed to be deviated from the X-Y plane $(X_4, Y_4, Z_4)$.

In an example, in the step S23, the positions of the first to fourth tracking devices $(X_2, X_3, Y_3, X_4, Y_4, Z_4)$ may be obtained to minimize a residual function $R_{on\_site}$ of Equation 7, $$\text{[Equation 7]}$$

$$R_{on\_site} =$$

$$\sum_{j=1}^{n-1}\varepsilon_j^2 = \sum_{j=1}^{n}\left[\left((x_j-X_4)^2+(y_j-Z_4)^2\right)^{-\frac{1}{2}}-(d_4+l_{4j})\right]^2$$

here, $$\sum_{j=1}^{n}\varepsilon_j^2$$

may be the sum of squared errors, $x_j$, $y_j$ and $z_j$ may be coordinates of a self-calibration position $P_j$ on the self-calibration plane with respect to a spatial coordination system $(X_{MLTS}, Y_{MLTS}, Z_{MLTS})$, and $x_j$, $y_j$ and $z_j$ may be defined by trilateration formula of Equations 8 to 10 below, $$x_j = \frac{(d_1+l_{1j})^2-(d_2+l_{2j})^2+X_2^2}{2X_2} \quad \text{[Equation 8]}$$

$$y_j = \frac{(d_1+l_{1j})^2-(d_3+l_{3j})^2+X_3^2+Y_3^2-2X_3x_j}{2Y_3} \quad \text{[Equation 9]}$$

$$z_j = \left((d_1+l_{1j})^2-x_j^2-y_j^2\right)^{-\frac{1}{2}} \quad \text{[Equation 10]}$$

here, $l_{1j}$, $l_{2j}$, $l_{3j}$, $l_{4j}$ may be absolute distances respectively measured by the first to fourth tracking devices, and $d_1$, $d_2$, $d_3$, $d_4$ may be dead paths of the first to fourth tracking devices respectively.

In an example, the position of each tracking devices may be calculated, and the distance of the object from each tracking device may be measured, and then the spatial coordinates of the object moving in the space may be obtained based on the calculated position and the measured distance.

According to the example embodiments, the self-calibration is performed based on the absolute distance measured by using the absolute measurement system, to obtain the position of each tracking device, which is the coordinates of each tracking device, and then the coordinates of the object moving in the space may be obtained more accurately.

Here, in using the relative distance measurement system, the initial length and the position of each tracking device should be obtained at the same time due to the characteristics of the relative distance measurement, so that the number of the system parameters obtained are increased and the accuracy or the reliability of the obtained results are low.

However, as in the present example embodiments, when the absolute distance measurement system is used, the dead path is pre-obtained and then the position of each tracking device may be obtained. Thus, the number of the system parameters which are obtained by performing the nonlinear optimization is decreased and the accuracy or the reliability of the obtained results may be increased.

Here, in obtaining the dead path in advance, the dead path of each tracking device is only obtained by performing the nonlinear optimization. Then, after the dead path of each tracking device is obtained in advance, the position of each tracking device, which is the coordinates of each tracking device, may be obtained by performing the nonlinear optimization. Thus, the number of the system parameters which are obtained at each the nonlinear optimization is decreased and the accuracy or the reliability of the obtained results may be increased.

In addition, when the conventional relative distance measurement system is applied, the method for determining the initial value in the nonlinear optimization process is not systemized and thus convergence failure or local minimum may occur in the optimization process. However, in the present example embodiment, the method for determining the initial value is presented more systematically, and thus the convergence failure or the local minimum may be prevented from being occurred and accuracy or the reliability of the obtained results may be increased.

BRIEF DESCRIPTION OF THE DRAWINGS

The above and other features and advantages of the present inventive concept will become more apparent by describing in detailed example embodiments thereof with reference to the accompanying drawings, in which:

FIG. 3 is a flow chart illustrating a self-calibration method using the multilateration system of FIG. 2;

FIG. 4 is a flow chart illustrating a dead path estimation process of FIG. 3;

FIG. 5 is a flow chart illustrating a position calculation process of a tracking device of FIG. 3;

Figure 1:
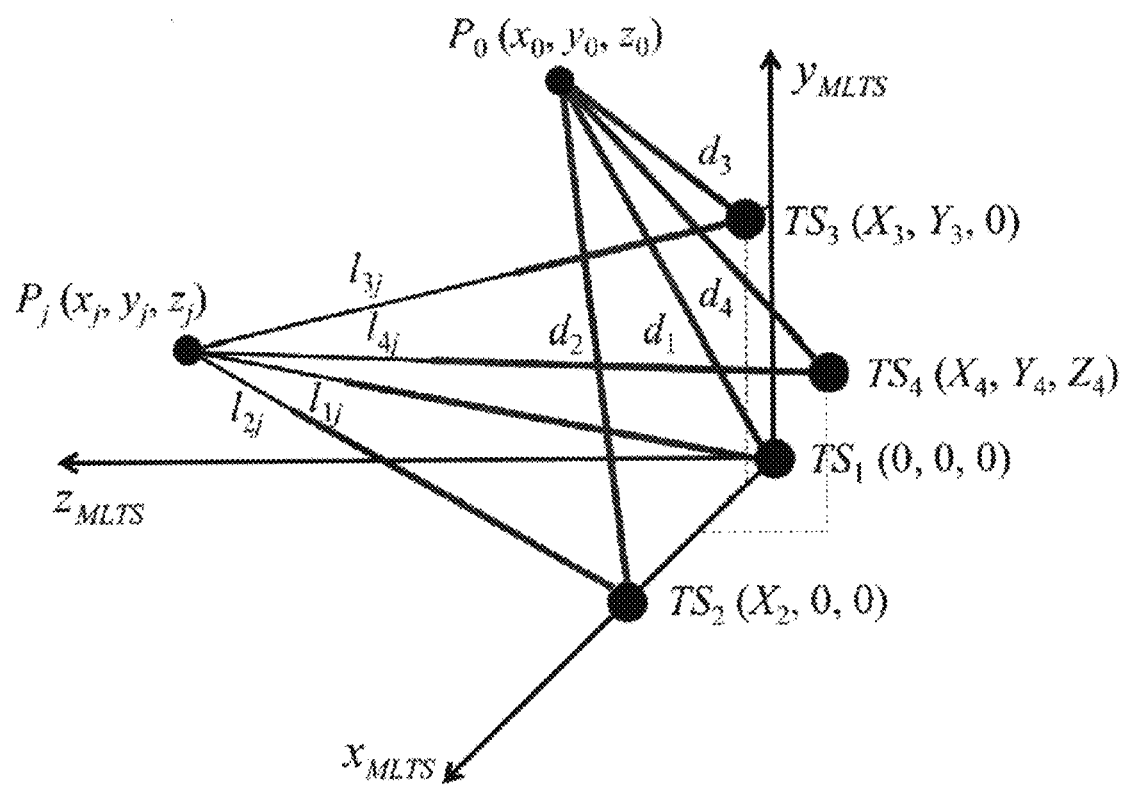
FIG. 1 is a coordination system for explaining a conventional multilateration system based on a relative distance measurement.

| [reference numerals] | |
|---|---|
| 10: multilateration system based on an absolute distance measurement | |
| 100: object | 200: absolute distance measurement system |
| 300: tracking device | 400: control calculation part |
| 410: dead path estimation part | 420: tracking device position calculation part |

DETAILED DESCRIPTION OF THE EMBODIMENTS

The present inventive concept now will be described more fully hereinafter with reference to the accompanying drawings, in which exemplary embodiments of the present invention are shown. The present inventive concept may, however, be embodied in many different forms and should not be construed as limited to the exemplary embodiments set fourth herein.

Rather, these exemplary embodiments are provided so that this disclosure will be thorough and complete, and will fully convey the scope of the present invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the inventive concept as used herein.

Hereinafter, the present inventive concept will be explained in detail with reference to the accompanying drawings.

FIG. 1 is a coordination system for explaining a conventional multilateration system based on a relative distance measurement.

Referring to FIG. 1, in the conventional multilateration system, a relative distance measurement system is used. In the conventional multilateration system, the positions $TS_1$, $TS_2$, $TS_3$ and $TS_4$ of four different tracking devices are determined as illustrated in FIG. 1, and the coordinates of the tracking devices are obtained via a self-calibration. Then, based on the distance from the coordinates of the tracking devices to an object $P_j$, the coordinates of the object in the space are obtained (Zhuang, H.; Li, B.; Roth, Z. S.; Xie, X. Self-calibration and mirror center offset elimination of a multi-beam laser tracking system. Robot. Auton. Syst. 1992, 9, 255-269).

In the conventional multilateration system, initial lengths $d_1$, $d_2$, $d_3$ and $d_4$ from an initial position $P_0$ at which the relative distance measurement system is initialized (the measured value of each relative distance measurement system is determined to be zero '0') to each tracking device, and system parameters $X_2$, $X_3$, $Y_3$, $X_4$, $Y_4$ and $Z_4$ of the coordinates defining the position of each tracking device, are obtained at the same time, via the so-called self-calibration.

In the relative distance measurement system, when the relative distance measurement system is initialized at an arbitrary position, the distance from the arbitrary position $P_0(x_0, y_0, z_0)$ to each tracking device is determined to be always zero '0', and thus the distance and the system parameters of the coordinates should be obtained at the same time, via the self-calibration.

However, when a large number of system parameters $d_1$, $d_2$, $d_3$, $d_4$, $X_2$, $X_3$, $Y_3$, $X_4$, $Y_4$ and $Z_4$ are obtained at the same time from a single equation, via nonlinear optimization, a residual function for obtaining an optimal solution becomes complex and thus an estimation result is not to be accurate, since the number of the system parameters is large. In addition, in obtaining the optimal solution, the initial values of the system parameters are necessary but the systematic method for determining the initial values is not presented, and thus convergence failure or local minimum may occur during the optimization.

Figure 2:
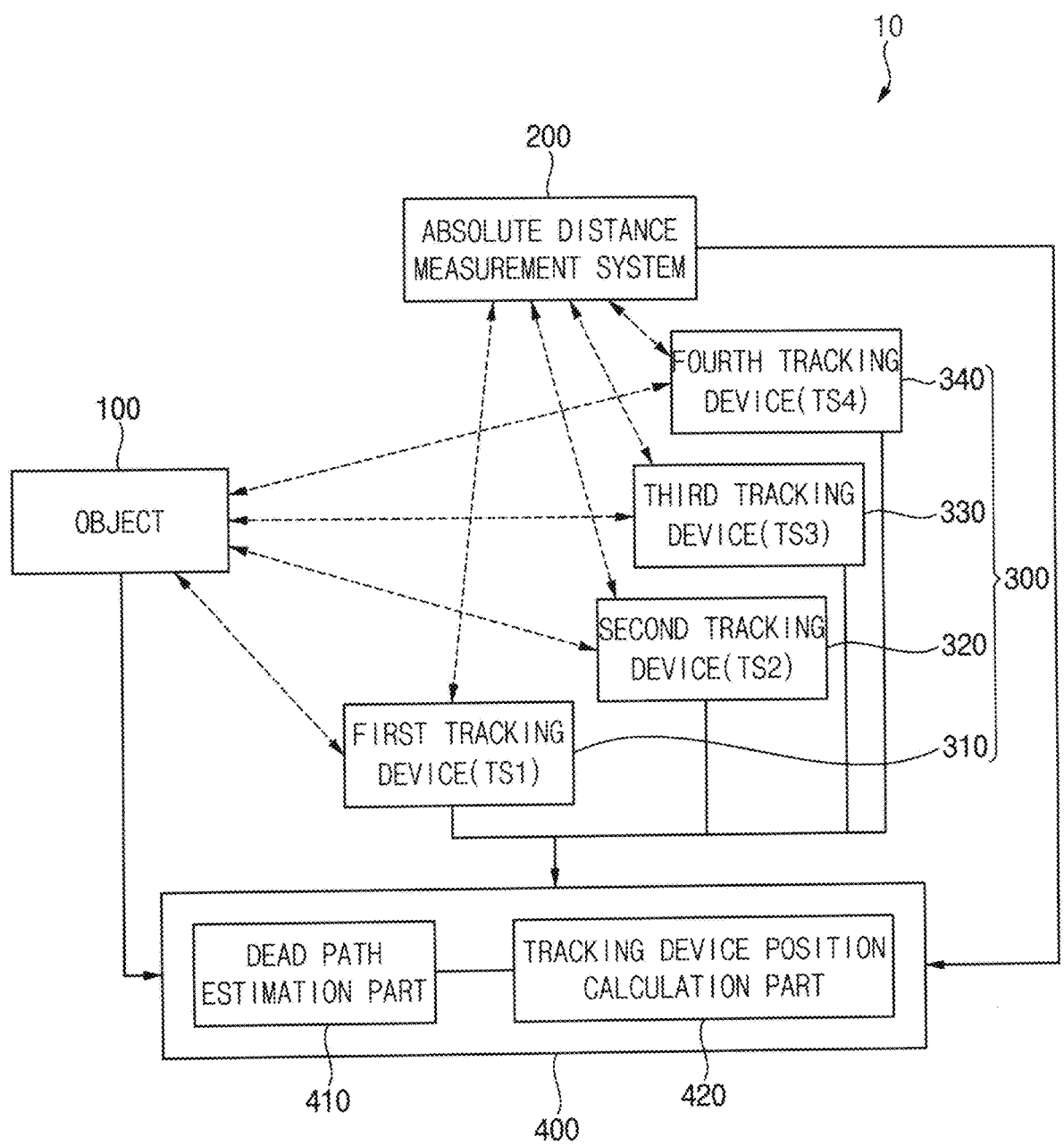
FIG. 2 is a block diagram illustrating a multilateration system based on an absolute distance measurement according to an example embodiment of the present invention.

FIG. 2 is a block diagram illustrating a multilateration system based on an absolute distance measurement according to an example embodiment of the present invention.

Referring to FIG. 2, the multilateration system based on the absolute distance measurement 10 (hereinafter, the multilateration system) is for obtaining spatial coordinates of an object 100 moving in a space, and includes a tracking unit 300, an absolute distance measurement system 200 and a control calculation part 400.

Here, the tracking unit 300 may include at least four tracking devices 310, 320, 330 and 340, and in the present example embodiment, an example having four tracking devices 310, 320, 330, 340 is explained for the convenience of the explanation.

The control calculation part 400 includes a dead path estimation part 410 and a tracking device position calculation part 420.

Hereinafter, for the convenience of the explanation, the multilateration system 10 is explained with a multilateration method using the multilateration system 10, at the same time.

Figure 6:
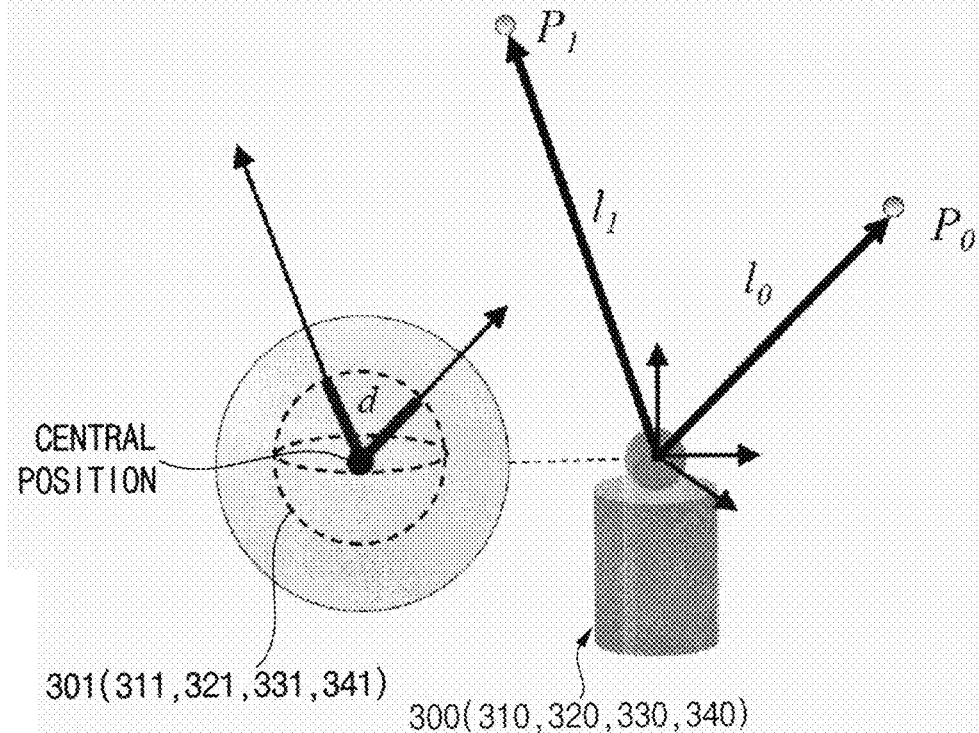
FIG. 6 is a schematic diagram for explaining the dead path in the multilateration system of FIG. 2.
Figure 7:
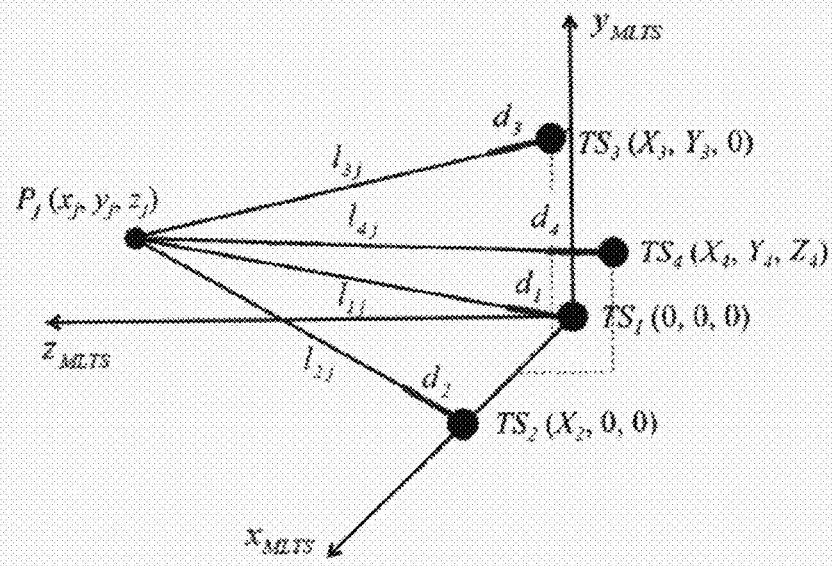
FIG. 7 is a coordination system for explaining the multilateration system of FIG. 2.
Figure 8:
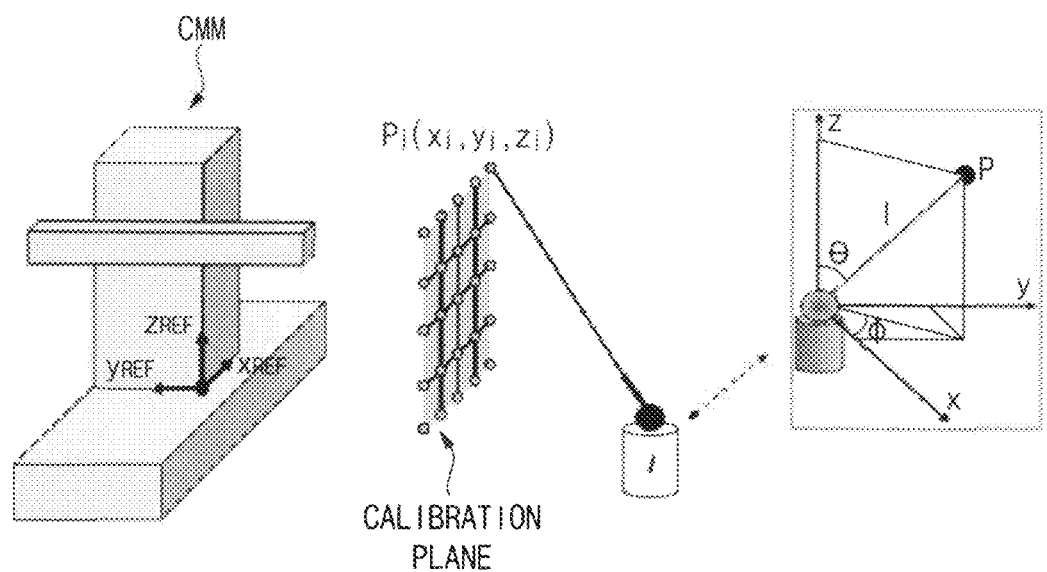
FIG. 8 is a schematic diagram illustrating a reference coordination system applied to the dead path estimation process of FIG. 4 and a local coordination system of the tracking device.
Figure 9:
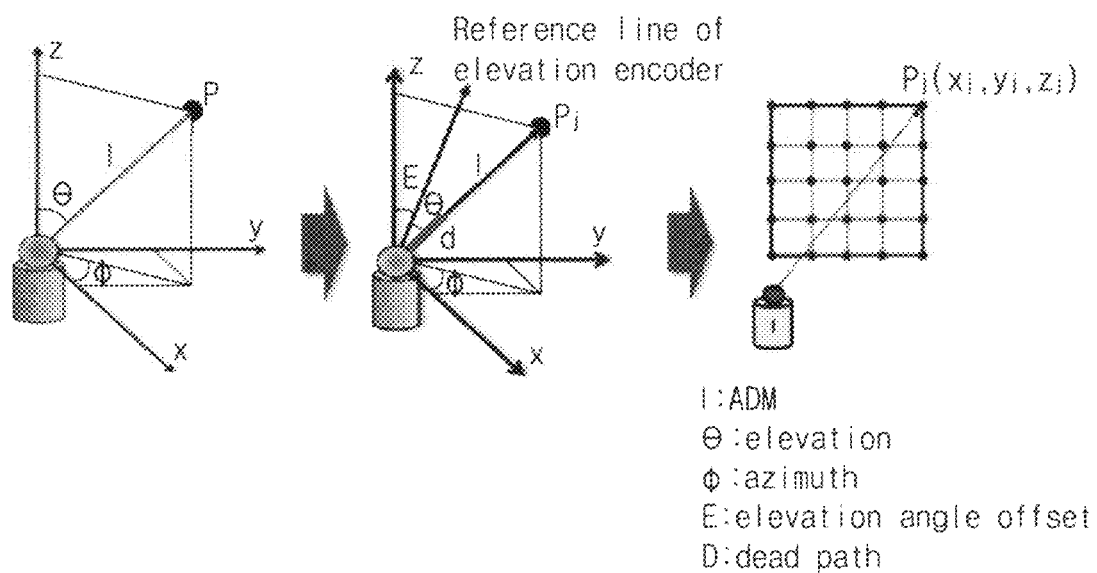
FIG. 9 is a schematic diagram illustrating a calculation process of an elevation angle offset and an initial value of a first dead path, in the dead path estimation process of FIG. 4.
Figure 10:
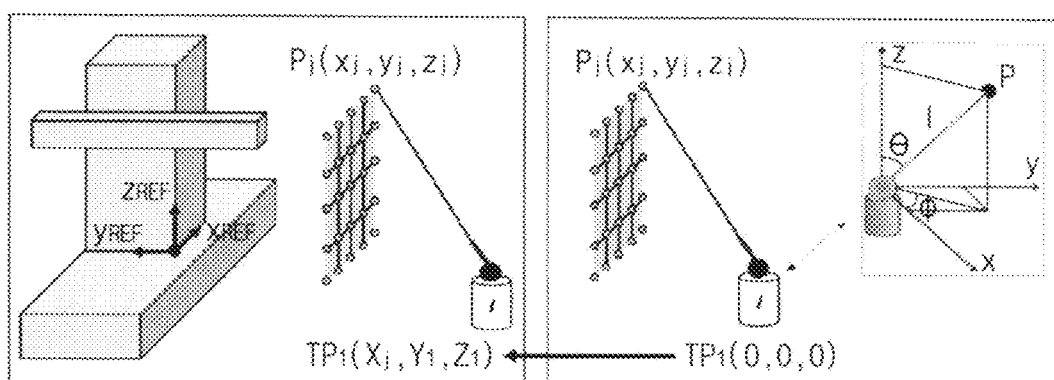
FIG. 10 is a schematic diagram illustrating a process of obtaining a position of a first tracking device and the first dead path with respect to the reference coordination system, in the dead path estimation process of FIG. 4.
Figure 11:
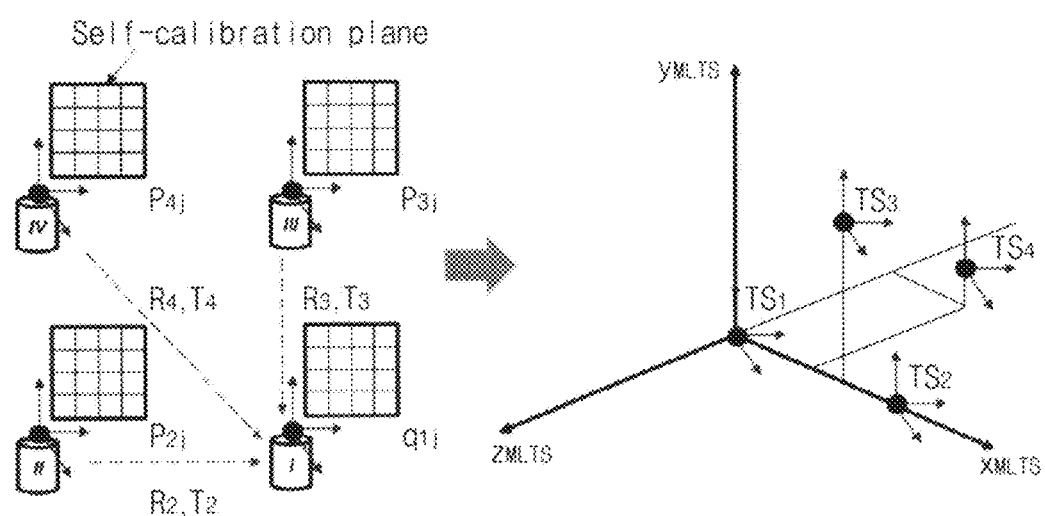
FIG. 11 is a schematic diagram for explaining a calculation process of a rotational matrix and a transformation matrix, and a calculation process of initial values of second to fourth tracking devices, in the position calculation process of the tracking device of FIG. 5.
Figure 12:
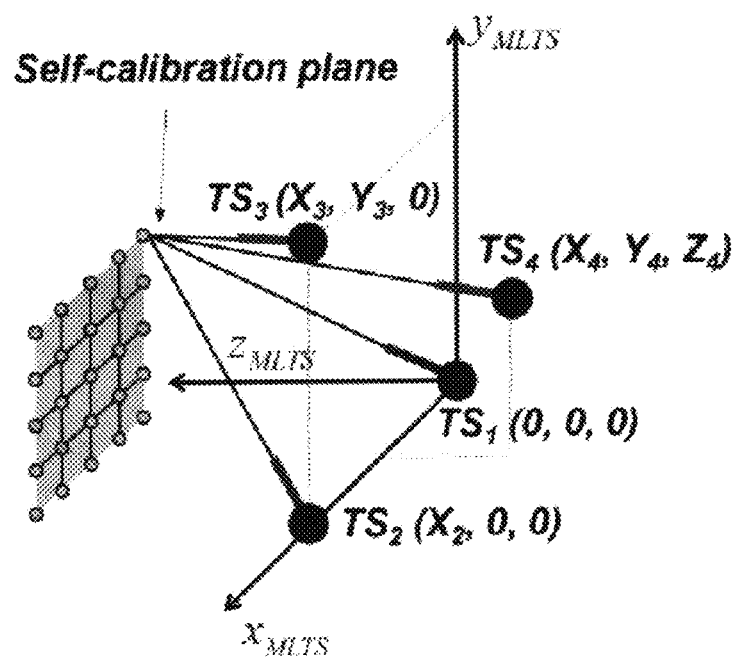
FIG. 12 is a schematic diagram for explaining a process of obtaining the positions of the second to fourth tracking devices via nonlinear optimization, in the position calculation process of the tracking device of FIG. 5.

FIG. 3 is a flow chart illustrating a self-calibration method using the multilateration system of FIG. 2. FIG. 4 is a flow chart illustrating a dead path estimation process of FIG. 3. FIG. 5 is a flow chart illustrating a position calculation process of a tracking device of FIG. 3. FIG. 6 is a schematic diagram for explaining the dead path in the multilateration system of FIG. 2. FIG. 7 is a coordination system for explaining the multilateration system of FIG. 2. FIG. 8 is a schematic diagram illustrating a reference coordination system applied to the dead path estimation process of FIG. 4 and a local coordination system of the tracking device. FIG. 9 is a schematic diagram illustrating a calculation process of an elevation angle offset and an initial value of a first dead path, in the dead path estimation process of FIG. 4. FIG. 10 is a schematic diagram illustrating a process of obtaining a position of a first tracking device and the first dead path with respect to the reference coordination system, in the dead path estimation process of FIG. 4. FIG. 11 is a schematic diagram for explaining a calculation process of a rotational matrix and a transformation matrix, and a calculation process of initial values of second to fourth tracking devices, in the position calculation process of the tracking device of FIG. 5. FIG. 12 is a schematic diagram for explaining a process of obtaining the positions of the second to fourth tracking devices via nonlinear optimization, in the position calculation process of the tracking device of FIG. 5.

Referring to FIG. 2, FIG. 3 and FIG. 7, in the multilateration method, the dead path estimation part 410 pre-estimate a dead path $d_1$, $d_2$, $d_3$ and $d_4$ (step S10, dead path estimation process). The dead path is defined as a distance between a measurement reference surface of the absolute distance measurement system 200 and a central position (rotational center) of each of the tracking devices 310, 320, 330 and 340.

Here, FIG. 2 shows a single absolute distance measurement system 200 disposed out of the tracking devices 310, 320, 330 and 340, for the convenience of explanation and understanding. However, the absolute distance measurement system 200 may be substantially inherent to or included in each of the tracking devices 310, 320, 330 and 340, and may be configured for the measurement.

That is, the absolute distance measurement system 200 is integrally formed with each of the tracking devices 310, 320, 330 and 340. However, the coordinates of the central position which is the rotational center of each tracking device in tracking the object, is different from the measurement reference surface which is a reference for the measurement in the absolute distance measurement system 200. Thus, the dead path $d_1$, $d_2$, $d_3$ and $d_4$ defining the difference should be estimated in advance.

The dead path and the estimation of the dead path are first explained referring to FIG. 6 and FIG. 7.

Referring to FIG. 6, generally when the distance for the object 100 is measured by using the absolute distance measurement system 200, as mentioned above, the measurement is performed based on the measurement reference surface 301 which is the reference for the measurement in the absolute distance measurement system 200.

However, when the object 100 is tracked by using the tracking devices 310, 320, 330 and 330 of the tracking unit 300, the distance between the object 100 and each tracking device 310, 320, 330 and 340 should be the distance between the object 100 and the origin (the central position) of each tracking device 310, 320, 330 and 340.

Thus, the difference between the central position which is the center of the rotation of each tracking device, and the measurement reference surface 301 which is the reference for the measurement in the absolute distance measurement system 200, may be defined as the dead path d.

Further, the dead path may be defined differently at each of the tracking devices 310, 320, 330 and 340, and thus in the dead path estimation process (step S10), each of the dead paths $d_1$, $d_2$, $d_3$ and $d_4$ should be pre-estimated for each of first to fourth tracking devices 310, 320, 330 and 340.

In the relative distance measurement system, each of initial lengths $d_1$, $d_2$, $d_3$ and $d_4$ to each of the tracking devices changes as an initial position $P_0$ at which the distance measurement is initialized changes, but in the absolute distance measurement system, the dead path is constant, and thus when the dead path $d_1$, $d_2$, $d_3$ and $d_4$ is once estimated accurately, as illustrated in FIG. 7, the distance from each of the first to fourth tracking devices 310, 320, 330 and 340 to the actual object 100 may be measured efficiently.

Based on the merits or the characteristics of the absolute distance measurement system, as illustrated in FIG. 3, the process for the estimation of the system parameters is divided into two steps, and a residual function is simplified to improve the accuracy of the estimation since the number of the estimated system parameters is decreased at each of two steps.

The dead path estimation process (step S10) is explained in detail below.

In the dead path estimation process (step S10), as illustrated in FIG. 8, a coordinate measuring machine (CMM) which is a high resolution reference coordination system may be used. Here, the coordinate measuring machine is an example system providing a reference coordinate, and thus in the present example embodiment, the system providing the reference coordinate may be applied except for the coordinate measuring machine. However, for the convenience of explanation, the coordinate measuring machine is used as the system providing the reference coordinate. Here, the coordinate measuring machine provides a calibration plane having a plurality of reference target points.

Further, the coordinate measuring machine is exampled to provide the calibration plane, but the coordinate measuring machine may also provide reference coordinate information having various kinds of reference points such as a three-dimensional structure except for the plane, but for the convenience of explanation, any further examples may be omitted.

In the calibration plane, a plurality of reference positions $P_j$ is provided with the coordinates of each of the reference positions, and the coordinates of each reference position provide relatively very accurate coordinates, and thus the estimation for the dead path may be more accurate.

For example, in the dead path estimation process (step S10), firstly, referring to FIG. 4, FIG. 8 and FIG. 9, an elevation angle offset $E_1$ and an initial value $d_{1\_ini}$ of the first dead path $d_1$ are determined for the first tracking device 310 (step S11).

Generally, in tracking the object 100, each tracking device rotates with changing an azimuth angle $\phi$ and an elevation angle $\theta$. Likewise, in the present example embodiment, a local coordinate system of each tracking device is used for systematically calculating an initial value of each system parameter for nonlinear optimization, in the dead path estimation process (step S10) and a tracking device position calculation process (step S20).

Here, as explained below, in the dead path estimation process (step S10), the local coordinate system of each tracking device and the coordination system of the coordinate measuring machine are applied.

The local coordinate system of each tracking device may be calculated by using the azimuth angle and elevation angle of an encoder equipped inside of each tracking device, and the measured absolute distance. However, as illustrated in FIG. 9, an offset exists between an Z axis of the local coordinate system perpendicular to a rotational surface (X-Y plane) of the azimuth angle and a reference line of an elevation angle encoder, due to an assembled condition, and the offset mentioned above is defined as an elevation angle offset E. However, as for the azimuth angle, the above mentioned problem does not exist.

Thus, the elevation angle offset is the value obtained in advance with the dead path, for estimating the coordinates of the central position of each tracking device accurately. Thus, in the dead path estimation process (step S10), the elevation angle offset and the dead path are obtained.

In determining the elevation angle offset $E_1$ and the initial value $d_{1\_ini}$ of the first dead path $d_1$ for the first tracking device 310 (step S11), firstly, as illustrated in FIG. 9, the first tracking device 310 is positioned to head for the calibration plane.

Here, the coordinate measuring machine providing the calibration plane provides vary accurate coordination system, and thus the reference positions $P_j$ in the calibration plane may be regarded to provide a fixed value in applying least-square adjustment.

Thus, for the first tracking device 310, the elevation angle offset $E_1$ and the initial value $d_{1\_ini}$ of the first dead path $d_1$ of the first tracking device 310 are determined, to minimize a residual function $R_{ele1}$ in Equation 1 below (step S11).

$$R_{ele1} = \sum_{j=1}^{n-1} \varepsilon_{ele1\_j}^2 = \qquad \text{[Equation 1]}$$

$$\sum_{j=1}^{n-1}\left[\left((x_j - x_{j+1})^2 + (y_j - y_{j+1})^2 + (z_j - z_{j+1})^2\right)^{-\frac{1}{2}} - l_{ref\_j}\right]^2$$

Here, n is the number of reference positions, $l_{ref\_j}$ is a distance between two positions $P_j(x_j, y_j, z_j)$ and $P_{j+1}(x_{j+1}, y_{j+1}, z_{j+1})$ which is provided in the coordinate measuring machine (CMM). $x_j$, $y_j$ and $z_j$ are defined by Equations 2 to 4 in the local coordinate system of the first tracking device 310.

$$x_j=(l_{1j}+d_{1\_ini})\times\sin(\Theta_{1j}+E_1)\times\cos(\phi_{1j}) \qquad \text{[Equation 2]}$$

$$y_j=(l_{1j}+d_{1\_ini})\times\sin(\Theta_{1j}+E_1)\times\sin(\phi_{1j}) \qquad \text{[Equation 3]}$$

$$z_j=(l_{1j}+d_{1\_ini})\times\cos(\Theta_{1j}+E_1) \qquad \text{[Equation 4]}$$

Here, $l_{1j}$ is an absolute distance measuring the reference position $P_j$ of the coordinate measuring machine (CMM) at the first tracking device, $\theta_{1j}$ is the elevation angle measured in the encoder inside of the tracking device, and $\phi_{1j}$ is the measured azimuth angle.

From Equation 1, the elevation angle offset $E_1$ and the initial value $d_{1\_ini}$ of the first dead path $d_1$ of the first tracking device 310 are determined, to minimize the difference between a first value and a second value. Here, the first value is the value measuring a distance between two different positions $(P_j, P_{j+1})$ in the calibration plane with respect to the local coordination system of the first tracking device 310, which is a left term of Equation 1

$$\left(((x_j - x_{j+1})^2 + (y_j - y_{j+1})^2 + (z_j - z_{j+1})^2)^{\frac{1}{2}}\right).$$

The second value is the distance between two different positions $(P_j, P_{j+1})$ provided by the coordinate measuring machine, which is a right term of Equation 1 ($l_{ref\_j}$).

Accordingly, when the elevation angle offset $E_1$ and the initial value $d_{1\_ini}$ of the first dead path $d_1$ of the first tracking device 310 are obtained, the first dead path of the first tracking device is obtained via the nonlinear optimization (step S12). Here in the step S12, the first dead path $d_1$ of the first tracking device 310 is obtained to minimize a residual function $R_1$ of Equation 5.

$$R_1 = \sum_{j=1}^{n} \varepsilon_{d1\_j}^2 = \qquad [\text{Equation 5}]$$

$$\sum_{j=1}^{n} \left[((x_j - X_1)^2 + (y_j - Y_1)^2 + (z_j - Z_1)^2)^{-\frac{1}{2}} - (d_1 + l_{1j})\right]^2$$

Here, $$\sum_{j=1}^{n} \varepsilon_{d1\_j}^2$$

is the sum of squared errors. $x_j$, $y_j$ and $z_j$ are the coordinates of the reference position $P_j$ provided in the coordinate measuring machine (CMM) and are fixed values. As illustrated in FIG. 10, $X_j$, $Y_j$ and $Z_j$ are the coordinates of the center of the first tracking device 310 which is defined with respect to the coordinate measuring machine (CMM). Thus, a left term in Equation 5

$$\left(((x_j - X_1)^2 + (y_j - Y_1)^2 + (z_j - Z_1)^2)^{\frac{1}{2}}\right)$$

is the distance between the coordinate measuring machine and the central position of the first tracking device 310, which are provided by the coordinate measuring machine (CMM).

In addition, $(d_1 + l_{1j})$, which is a right term in Equation 5, is an actual measured distance by using the first tracking device 310, for the distance to the reference position $P_j$ of the coordinate measuring machine (CMM).

Thus, the first dead path $d_1$ of the first tracking device 310 is obtained to minimize the residual function $R_1$ of Equation 5.

When the first dead path $d_1$ of the first tracking device 310 is obtained via the nonlinear optimization using Equation 5, $X_1$, $Y_1$ and $Z_1$ are also obtained with the first dead path $d_1$. Thus, as explained above, as the initial value $d_{1\_ini}$ of the first dead path $d_1$ is necessary to obtain the first dead path $d_1$, initial values of $X_1$, $Y_1$ and $Z_1$ are also necessary to obtain $X_1$, $Y_1$ and $Z_1$.

Here, $X_1$, $Y_1$ and $Z_1$ is the coordinates of the central position of the first tracking device 310 defined with respect to the coordinate measuring machine (CMM), and thus the central position of the first tracking device 310 is defined as (0, 0, 0) based on the local coordination system of the first tracking device 310. Thus, the coordinates $(X_1, Y_1, Z_1)$ which is defined with respect to the coordinate measuring machine (CMM) for the first tracking device 310 may be defined as a transformation matrix of the coordinates (0, 0, 0) which is defined with respect to the local coordination system of the first tracking device 310.

Using the elevation angle offset $E_1$ and the initial value $d_{1\_ini}$ of the first dead path $d_1$ of the first tracking device 310 obtained in the step S11, each position in the calibration plane displayed by the coordinate measuring machine may be roughly displayed as the local coordination system of the first tracking device.

Accordingly, for the central position of the first tracking device 310, the transformation matrix from the local coordination system to the coordination system of the coordinate measuring machine (CMM) may be obtained substantially same as a rotational matrix and transformation matrix calibration process (step S21). In addition, based on the above, the initial value for the central position $(X_1, Y_1, Z_1)$ of the first tracking device 310 may be provided.

Thus, based on the initial value $d_{1\_ini}$ of the first dead path $d_1$ and the initial value of the central position $(X_1, Y_1, Z_1)$ of the first tracking device 310, the first dead path $d_1$ may be obtained by the nonlinear optimization using Equation 5.

Like the determination of the elevation angle offset $E_1$ and the initial value $d_{1\_ini}$ of the first dead path $d_1$ of the first tracking device 310, elevation angle offsets $E_2$, $E_3$ and $E_4$ and initial values $d_{2\_ini}$, $d_{3\_ini}$ and $d_{4\_ini}$ of dead paths $d_2$, $d_3$ and $d_4$ may be determined for the second and fourth tracking devices 320, 330 and 340, respectively.

In addition, like the obtainment of the first dead path $d_1$ via the nonlinear optimization as explained in the step S12, the second to fourth dead paths $d_2$, $d_3$ and $d_4$ may be obtained for the second to fourth tracking devices 320, 330 and 340, respectively.

Here, for each of the second to fourth tracking devices 320, 330 and 340, the method for obtaining the transformation matrix at the first tracking device 310 may be applied to the transformation matrix from the local coordination system of each tracking device to the coordination system of the coordinate measuring machine (CMM). Thus, using the above transformation matrix, the second to fourth dead paths $d_2$, $d_3$ and $d_4$ may be obtained via the above explained nonlinear optimization.

Then, the dead path estimation process (step S10) is finished.

Then, each tracking device at which the dead path is calibrated via the dead path estimation process (step S10) is disposed as illustrated in FIG. 7, for measuring the three-dimensional coordinates of the object 100.

Referring to FIG. 3 and FIG. 5, in the multilateration method, the tracking device position calculation part 420 calculates the position of each of the first to fourth tracking devices 310, 320, 330 and 340 via the nonlinear optimization (tracking device position calculation process) (step S20).

Here, in the tracking device position calculation process, firstly, the rotational matrix and the transformation matrix are calculated among the positions of the first to fourth tracking devices 310, 320, 330 and 340 (step S21).

Referring to FIG. 11, as illustrated in the figure, the first to fourth tracking devices 310, 320, 330 and 340 are positioned at the single spatial coordinates ($X_{MLTS}$, $Y_{MLTS}$, $Z_{MLTS}$), and the rotational matrix R and the transformation matrix T for performing the position transformation among the first to fourth tracking devices 310, 320, 330 and 340 are calculated. Here, the positions of the plurality of positions in the self-calibration plane may be expressed as the local coordination system of each tracking device, using the dead paths $d_1$, $d_2$, $d_3$ and $d_4$ and the elevation angle offset E1, E2, E3 and E4 obtained in the step S10, and the measured azimuth angle and elevation angle provided from the encoder. Thus, based on the above expression, the position relation among the tracking devices may be roughly obtained. Here, the roughly obtained means that the measured angle has low accuracy since the angle is measured only to the extend necessary for the control in the multilateration system in which the three-dimensional coordinates are measured by merely using the distance information, compared to a laser tracker at which accurate angle measurement is performed or required. That is, since relatively inaccurate angle information is used, the position relation based on the inaccurate angle information is merely used for the initial value in the optimization process.

The position relation among the tracking devices 310, 320, 330 and 340 may be obtained by applying best-fitting rigid transformation from the local coordinates $p_{2j}$, $p_{3j}$ and $p_{4j}$ of the second to fourth tracking devices 320, 330 and 330 to the local coordinates $q_{1j}$ of the first tracking device 310.

The rotational matrix R and the transformation matrix T are calculated to minimize a residual function $R_{trans}$ of Equation 6, and thus the position relation among the first to fourth tracking devices 310, 320, 330 and 340 is obtained.

$$R_{trans} = \sum_{j=1}^{n} \|(Rp_j + T) - q_j\|^2 \quad \text{[Equation 6]}$$

Here, $q_j$ is the local coordinates of the first tracking device 310, and $p_j$ is the local coordinates of the second to fourth tracking devices 320, 330 and 340.

Then, in the tracking device position calculation process, the initial value of each of the first to fourth tracking devices 310, 320, 330 and 340 is determined (step S22).

Referring to FIG. 12, the coordinates of the first tracking device 310 is transformed to be an origin (0, 0, 0), and the coordinates of the second to fourth tracking devices 320, 330 and 340 are transformed to determine the initial values, using the rotational matrix R and the transformation matrix T obtained in Equation 6.

For example, the coordinates of the second tracking device is transformed to be on the X axis ($X_2$, 0, 0), the coordinates of the third tracking device is transformed to be on the X-Y plane ($X_3$, $Y_3$, 0), and the coordinates of the fourth tracking device is transformed to be deviated from the X-Y plane ($X_4$, $Y_4$, $Z_4$), in the spatial coordination system ($X_{MLTS}$, $Y_{MLTS}$, $Z_{MLTS}$).

Thus, the initial values of the positions of the second to fourth tracking devices 320, 330 and 340, which are the initial values of $X_2$, $X_3$, $Y_3$, $X_4$, $Y_4$ and $Z_4$, may be determined.

Then, the positions of the first to fourth tracking devices 310, 320, 330 and 340 are finally obtained, via the nonlinear optimization (step S23).

Here, the method for obtaining the positions of the first to fourth tracking devices 310, 320, 330 and 340, via the nonlinear optimization, is as follows.

The positions of the first to fourth tracking devices ($X_2$, $X_3$, $Y_3$, $X_4$, $Y_4$, $Z_4$) are obtained to minimize a residual function $R_{on\_site}$ of Equation 7 below.

$$R_{on\_site} = \sum_{j=1}^{n} \varepsilon_j^2 = \quad \text{[Equation 7]}$$

$$\sum_{j=1}^{n} \left[ \left((x_j - X_4)^2 + (y_j - Y_4)^2 + (z_j - Z_4)^2\right)^{\frac{1}{2}} - (d_4 + l_{4j}) \right]^2$$

Here, $$\sum_{j=1}^{n} \varepsilon_j^2$$

is the sum of squared errors. $x_j$, $y_j$ and $z_j$ are coordinates of a self-calibration position $P_j$ on the self-calibration plane with respect to the spatial coordination system ($X_{MLTS}$, $Y_{MLTS}$, $Z_{MLTS}$)

Thus, a left term in Equation 7

$$\left(\left((x_j - X_4)^2 + (y_j - Y_4)^2 + (z_j - Z_4)^2\right)^{\frac{1}{2}}\right)$$

means the distance between the self-calibration position $P_j$ and the central coordinates ($X_4$, $Y_4$, $Z_4$) of the fourth tracking device. In addition, a right term in Equation 7 ($d_4 + l_{4j}$) means an actual measured distance for the distance to the self-calibration position $P_j$ using the fourth tracking device 340. Here, the fourth dead path $d_4$ of the fourth tracking device should be considered in the actual measured distance, as explained above.

The coordinates ($X_2$, $X_3$, $Y_3$) for obtaining the coordinates of the first to third tracking devices, and the actually measured distance ($d_1+l_{1j}$, $d_2+l_{2j}$, $d_3+l_{3j}$) (here, $d_1$, $d_2$ and $d_3$ are the dead paths of the first to third tracking devices respectively, as explained above) for the distance to the self-calibration position $P_j$ from the first to third tracking devices, have the relation of trilateration formula of Equations 8 to 10 below with $x_j$, $y_j$ and $z_j$.

$$x_j = \frac{(d_1 + l_{1j})^2 - (d_2 + l_{2j})^2 + X_2^2}{2X_2} \quad \text{[Equation 8]}$$

$$y_j = \frac{(d_1 + l_{1j})^2 - (d_3 + l_{3j})^2 + X_3^2 + Y_3^2 + 2X_3 x_j}{2Y_3} \quad \text{[Equation 9]}$$

$$z_j = \left((d_1 + l_{1j})^2 - x_j^2 - y_j^2\right)^{\frac{1}{2}} \quad \text{[Equation 10]}$$

Here, $l_{1j}$, $l_{2j}$, $l_{3j}$, $l_{4j}$ are absolute distances respectively measured by the first to fourth tracking devices 310, 320, 330 and 340, and $d_1$, $d_2$, $d_3$, $d_4$ are the dead paths of the first to fourth tracking devices 310, 320, 330 and 340 respectively, as explained above.

Accordingly, considering Equations 8 to 10 in addition to Equation 7, the coordinates of the central positions of the first to fourth tracking devices ($X_2$, $X_3$, $Y_3$, $X_4$, $Y_4$, $Z_4$) are obtained at the same time to minimize the residual function $R_{on\_site}$ of Equation 7.

In the above explanation, the self-calibration plane provides the plane, but the self-calibration plane may provide various kinds of self-calibration information including various kinds of reference positions such as a three-dimensional structure except for the plane.

Accordingly, when the position calculation for the tracking device is finished (step S20), the position of the second tracking device 320 positioned on the X axis, the position of the third tracking device 330 positioned on the X-Y plane, and the position of the fourth tracking device 340 deviated from the X-Y plane, are obtained, in addition to the position of the first tracking device 310 positioned at the origin.

Thus, the distance to the object 100 moving in the space from four tracking devices positioned differently may be obtained, and the coordinates of the object 100 in the space may be obtained based on the above distance and the position of four tracking devices.

Figure 13:
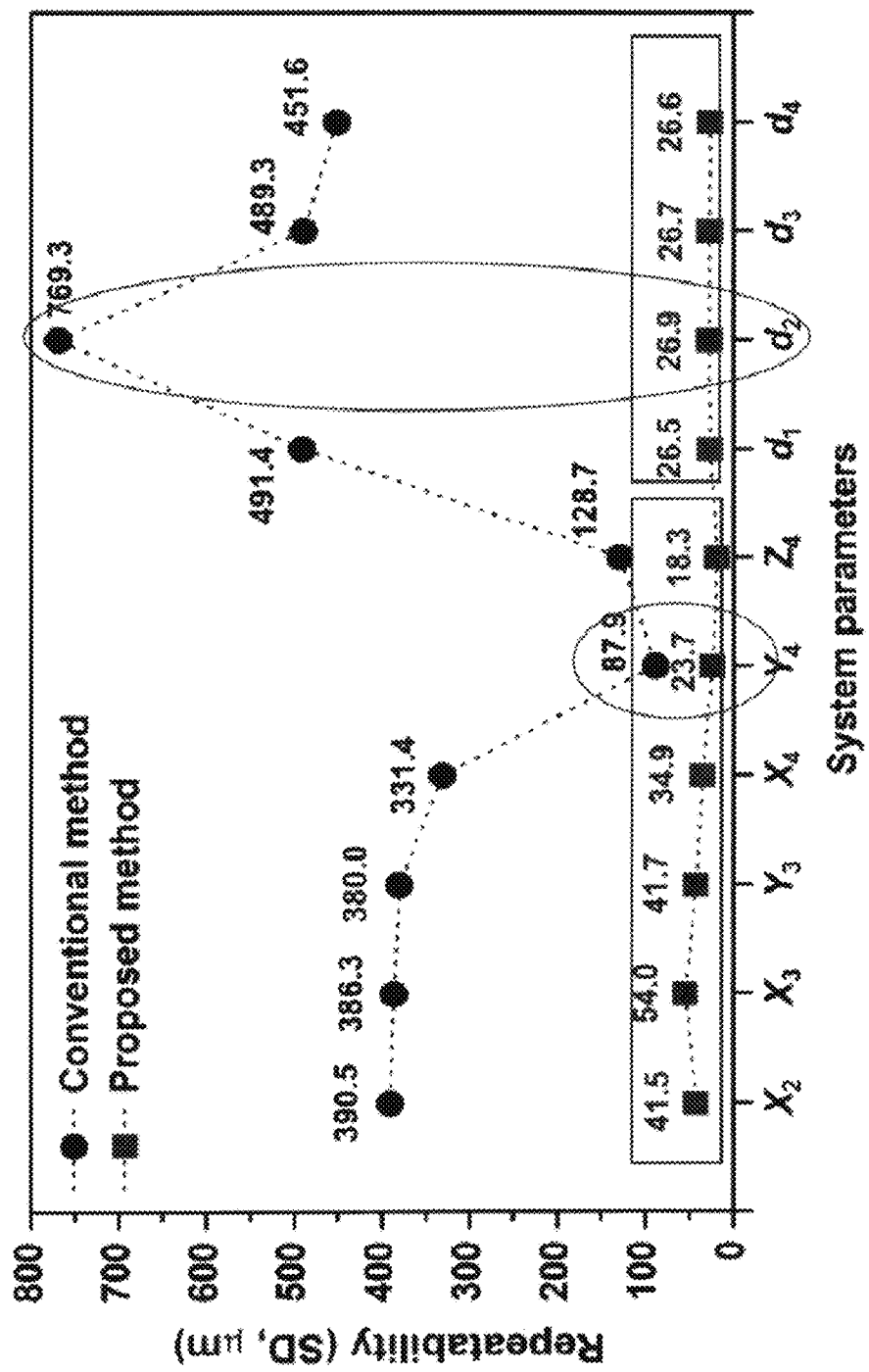
FIG. 13 is a graph showing repeatability of results obtained by the conventional method and the multilateration system of FIG. 2, for the dead paths and the position of the tracking devices.

FIG. 13 is a graph showing repeatability of results obtained by the conventional method and the multilateration system of FIG. 2, for the dead paths and the position of the tracking devices.

FIG. 13 shows a simulated repeatability (which is a standard deviation SD) of the system parameters obtained by using the self-calibration method in the multilateration method based on the conventional relative distance measurement and a simulated repeatability of the system parameters obtained by using the self-calibration method in the multilateration method based on the absolute distance measurement of the present example embodiment. As explained above, in the self-calibration method in the multilateration method based on the conventional relative distance measurement, the system parameters such as $d_1$, $d_2$, $d_3$, $d_4$, $X_2$, $X_3$, $Y_3$, $X_4$, $Y_4$ and $Z_4$ are obtained at the same time via the nonlinear optimization. However, in the self-calibration method in the multilateration method based on the absolute distance measurement, $d_1$, $d_2$, $d_3$ and $d_4$ are obtained in advance and then $X_2$, $X_3$, $Y_3$, $X_4$, $Y_4$ and $Z_4$ are obtained.

Referring to FIG. 13, the system parameters obtained from the self-calibration method according to the present example embodiment has relatively low standard deviation SD, compared to those according to the conventional technology.

Figure 14:
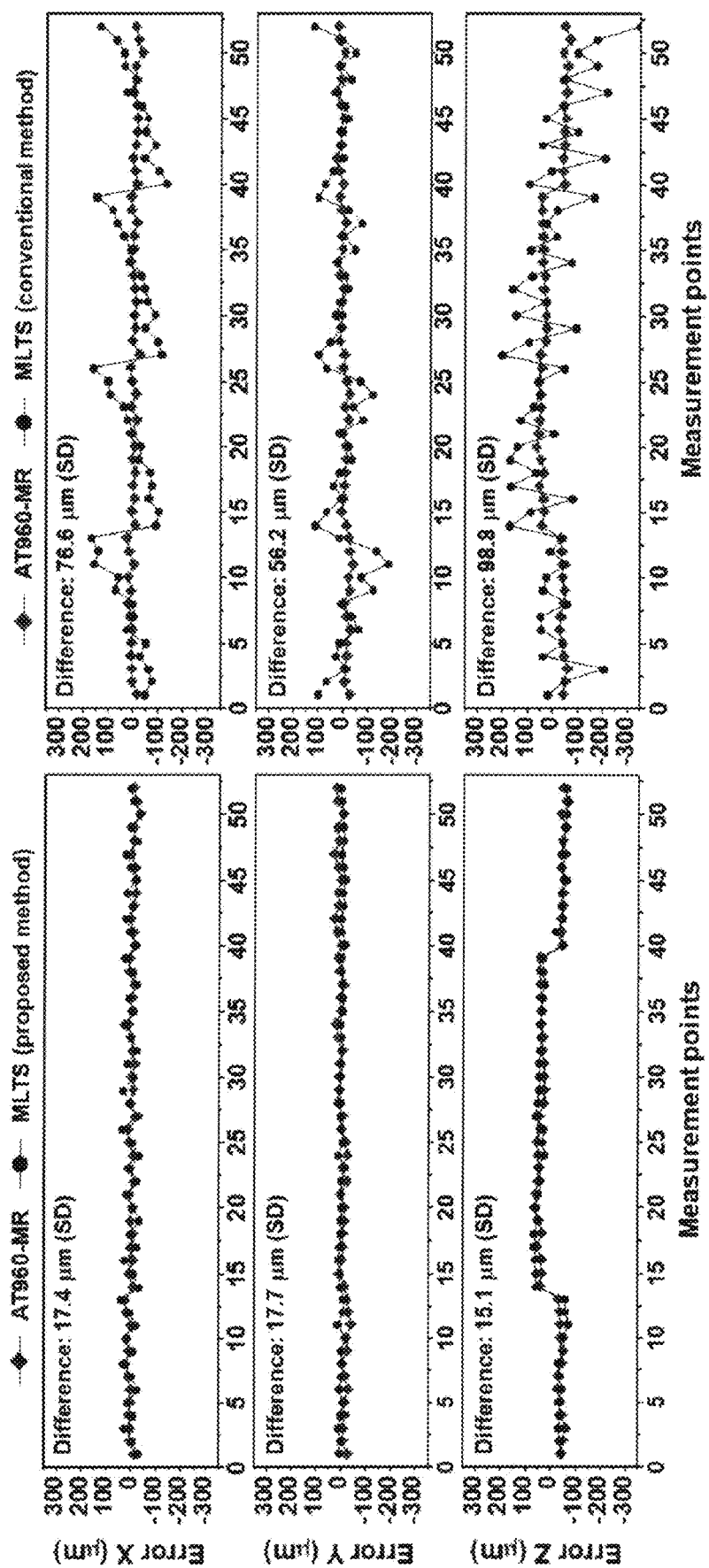
FIG. 14 is a graph showing error of the coordinates of the object measured by the conventional method and the multilateration system of FIG. 2.

FIG. 14 is a graph showing error of the coordinates of the object measured by the conventional method and the multilateration system of FIG. 2.

Likewise, FIG. 14 shows errors for various kinds of measuring positions according to each axis (X, Y, Z), at the measured results of the coordinates (X, Y, Z) for the object according to the conventional technology and the measured results of the coordinates (X, Y, Z) for the object according to the present example embodiment.

Here, for the comparison with the reference measured results, the measured results using a commercialized laser tracker are also illustrated.

Referring to FIG. 14, the error of the measured results via the multilateration method according to the present example embodiment is relatively small, and the measured results are very similar to the measured results via the commercialized laser tracker.

Thus, the position of the object moving or positioning in the space may be measured more accurately and more precisely, using the multilateration method according to the present example embodiment.

According to the example embodiments of the present invention, the self-calibration is performed based on the absolute distance measured by using the absolute measurement system, to obtain the position of each tracking device, which is the coordinates of each tracking device, and then the coordinates of the object moving in the space may be obtained more accurately.

Here, in using the relative distance measurement system, the initial length and the position of each tracking device should be obtained at the same time due to the characteristics of the relative distance measurement, so that the number of the system parameters obtained are increased and the accuracy or the reliability of the obtained results are low.

However, as in the present example embodiments, when the absolute distance measurement system is used, the dead path is pre-obtained and then the position of each tracking device may be obtained. Thus, the number of the system parameters which are obtained by performing the nonlinear optimization is decreased and the accuracy or the reliability of the obtained results may be increased.

Here, in obtaining the dead path in advance, the dead path of each tracking device is only obtained by performing the nonlinear optimization. Then, after the dead path of each tracking device is obtained in advance, the position of each tracking device, which is the coordinates of each tracking device, may be obtained by performing the nonlinear optimization. Thus, the number of the system parameters which are obtained at each the nonlinear optimization is decreased and the accuracy or the reliability of the obtained results may be increased.

In addition, when the conventional relative distance measurement system is applied, the method for determining the initial value in the nonlinear optimization process is not systemized and thus convergence failure or local minimum may occur in the optimization process. However, in the present example embodiment, the method for determining the initial value is presented more systematically, and thus the convergence failure or the local minimum may be prevented from being occurred and accuracy or the reliability of the obtained results may be increased.

The foregoing is illustrative of the present inventive concept and is not to be construed as limiting thereof. Although a few example embodiments of the present inventive concept have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific example embodiments disclosed, and that modifications to the disclosed example embodiments, as well as other example embodiments, are intended to be included within the scope of the appended claims. The present inventive concept is defined by the following claims, with equivalents of the claims to be included therein.

What is claimed is:

1. A multilateration system configured to obtain spatial coordinates of an object moving in a space, the multilateration system comprising:
a tracking unit having a plurality of tracking devices, wherein the tracking devices are positioned differently with each other and each of the tracking devices measures a distance to the object by using an absolute distance measurement system; and
a control calculation part comprising:
a dead path estimation part configured to pre-estimate a dead path which is a distance between a measurement reference surface of each tracking device and a central position of each tracking device; and
a tracking device position calculation part configured to calculate the central position of each tracking device via nonlinear optimization,
wherein the dead path estimation part is configured to pre-estimate the dead path by using a reference coordination system providing reference coordinates information,
wherein the dead path estimation part is configured to determine an elevation angle offset and an initial value of the dead path for each of the tracking devices to minimize a difference between a first value and a second value, and then the dead path estimation part is configured to obtain the dead path of each of the tracking devices via the nonlinear optimization, and
wherein the first value is a value measuring a distance between two different positions with respect to a local coordination system of each of the tracking devices, and the second value is a distance between two different positions provided by the reference coordination system,
wherein the tracking device position calculation part is configured to determine initial values of the central positions of the tracking devices, and
wherein the dead path of one tracking device is obtained based on the initial value of the dead path of the one tracking device and the initial value of the central position of the one tracking device.

2. The multilateration system of claim 1, wherein the tracking device position calculation part is configured to obtain the central position of each tracking device via the nonlinear optimization, based on the initial value of the central position of each tracking device.

3. The multilateration system of claim 1, wherein the tracking devices are at least four.

4. A multilateration method using a tracking unit having a plurality of tracking devices, wherein the tracking devices are positioned differently with each other and each of the tracking devices measures a distance to the object by using an absolute distance measurement system, the multilateration method comprising:
a dead path estimation process (step S10), in which a dead path which is a distance between a measurement reference surface of each tracking device and a central position of each tracking device is pre-estimated; and
a tracking device position calculation process (step S20), in which the central position of each tracking device is calculated via nonlinear optimization,
wherein in the dead path estimation process, a reference coordination system providing reference coordinates information is used to pre-estimate the dead path,
wherein in the dead path estimation process, an elevation angle offset and an initial value of the dead path for each of the tracking devices is determined to minimize a difference between a first value and a second value, and then the dead path of each of the tracking devices is obtained via the nonlinear optimization,
wherein the first value is a value measuring a distance between two different positions with respect to a local coordination system of each of the tracking devices, and the second value is a distance between two different positions provided by the reference coordination system,
wherein in the tracking device position calculation process, initial values of the central positions of the tracking devices are determined, and
wherein the dead path of one tracking device is obtained based on the initial value of the dead path of the one tracking device and the initial value of the central position of the one tracking device.

5. The multilateration method of claim 4, wherein the dead path estimation process further comprises:
determining the elevation angle offset and the initial value of a first dead path for a first tracking device (step S11);
obtaining the first dead path of the first tracking device, via the nonlinear optimization (step S12); and
respectively obtaining the dead paths of remaining tracking devices except for the first tracking device (step S13).

6. The multilateration method of claim 5, wherein in the step S11,
the elevation angle offset of the first tracking device $E_1$ and the initial value of the first dead path $d_{1\_ini}$ are determined to minimize a residual function $R_{ele1}$ of Equation 1, $$R_{ele1} = \sum_{j=1}^{n-1} \varepsilon_{ele1\_j}^2 = \sum_{j=1}^{n-1}\left[\left((x_j - x_{j+1})^2 + (y_j - y_{j+1})^2 + (z_j - z_{j+1})^2\right)^{\frac{1}{2}} - l_{ref\_j}\right]^2$$

[Equation 1]

here, n is the number of reference positions, $1_{ref\_j}$ is a distance between two positions $P_j(x_j, y_j, z_j)$ and $P_{j+1}(x_{j+1}, y_{j+1}, z_{j+1})$ which is provided in the reference coordination system, $x_j$, $y_j$ and $z_j$ are defined by Equations 2 to 4 in a local coordination system of the first tracking device, $$x_j = (l_{1j} + d_{1\_ini}) \times \sin(\Theta_{1j} + E_1) \times \cos(\varphi_{1j})$$ [Equation 2]

$$y_j = (l_{1j} + d_{1\_ini}) \times \sin(\Theta_{1j} + E_1) \times \sin(\varphi_{1j})$$ [Equation 3]

$$z_j = (l_{1j} + d_{1\_ini}) \times \cos(\Theta_{1j} + E_1)$$ [Equation 4]

here, $l_{1j}$ is an absolute distance measuring the reference position $P_j$ of the reference coordination system at the first tracking device, $\theta_{1j}$ is a measured elevation angle, and $\varphi_{1j}$ is a measured azimuth angle.

7. The multilateration method of claim 6, wherein in the step S12,
the first dead path $d_1$ of the first tracking device is obtained to minimize a residual function $R_1$ of Equation 5, $$R_1 = \sum_{j=1}^{n} \varepsilon_{d1\_j}^2 =$$

[Equation 5]

-continued $$\sum_{j=1}^{n}\left[((x_j - X_1)^2 + (y_j - Y_1)^2 + (z_j - Z_1)^2)^{\frac{1}{2}} - (d_1 + l_{1j})\right]^2$$

here, $$\sum_{j=1}^{n} \varepsilon_{d1\_j}^2$$

is the sum of squared errors, $x_j$, $y_j$ and $z_j$ are the coordinates of the reference position $P_j$ provided in the reference coordination system, $X_j$, $Y_j$ and $Z_j$ are the coordinates of the center of the first tracking device which is defined with respect to the reference coordination system, and $(d_1+l_{1j})$ is an actual measured distance by using the first tracking device with respect to the distance to the reference position $P_j$ of the reference coordination system.

8. The multilateration method of claim 5, wherein the tracking device position calculation process comprises:
calculating a rotational matrix and a transformation matrix among the first to fourth tracking devices (step S21);
determining the initial values of the central positions of the first to fourth tracking devices (step S22); and
obtaining the central positions of the first to fourth tracking devices via the nonlinear optimization (step S23).

9. The multilateration method of claim 8, in the step S21, the rotational matrix and the transformation matrix are calculated to minimize a residual function $R_{trans}$ of Equation 6, $$R_{trans} = \sum_{j=1}^{n} \left\| (Rp_j + T) - q_j \right\|^2 \qquad \text{[Equation 6]}$$

here, $q_j$ is a local coordinates of the first tracking device, and $p_j$ is local coordinates of the remaining tracking devices.

10. The multilateration method of claim 9, in the step S22, the coordinates of the first tracking device is transformed to be an origin (0, 0, 0), the coordinates of the second tracking device is transformed to be on the X axis ($X_2$, 0, 0), the coordinates of the third tracking device is transformed to be on the X-Y plane ($X_3$, $Y_3$, 0), and the coordinates of the fourth tracking device is transformed to be deviated from the X-Y plane ($X_4$, $Y_4$, $Z_4$).

11. The multilateration method of claim 10, in the step S23,
the central positions of the first to fourth tracking devices ($X_2$, $X_3$, $Y_3$, $X_4$, $Y_4$, $Z_4$) are obtained to minimize a residual function $R_{on\_site}$ of Equation 7, $$R_{on\_site} = \sum_{j=1}^{n} \varepsilon_j^2 = \qquad \text{[Equation 7]}$$

$$\sum_{j=1}^{n}\left[((x_j - X_4)^2 + (y_j - Y_4)^2 + (z_j - Z_4)^2)^{\frac{1}{2}} - (d_4 + l_{4j})\right]^2$$

here, $$\sum_{j=1}^{n} \varepsilon_j^2$$

is the sum of squared errors, $x_j$, $y_j$ and $z_j$ are coordinates of a self-calibration position $P_j$ on the self-calibration plane with respect to a spatial coordination system ($X_{MLTS}$, $Y_{MLTS}$, $Z_{MLTS}$), and $x_j$, $y_j$ and $z_j$ are defined by trilateration formula of Equations 8 to 10 below, $$x_j = \frac{(d_1 + l_{1j})^2 - (d_2 + l_{2j})^2 + X_2^2}{2X_2} \qquad \text{[Equation 8]}$$

$$y_j = \frac{(d_1 + l_{1j})^2 - (d_3 + l_{3j})^2 + X_3^2 + Y_3^2 - 2X_3 x_j}{2Y_3} \qquad \text{[Equation 9]}$$

$$z_j = ((d_1 + l_{1j})^2 - x_j^2 - y_j^2)^{\frac{1}{2}} \qquad \text{[Equation 10]}$$

here, $l_{1j}$, $l_{2j}$, $l_{3j}$, $l_{4j}$ are absolute distances respectively measured by the first to fourth tracking devices, and $d_1$, $d_2$, $d_3$, $d_4$ are dead paths of the first to fourth tracking devices respectively.

12. The multilateration method of claim 4, wherein the central position of each tracking device is calculated, and the distance of the object from each tracking device is measured, and then the spatial coordinates of the object moving in the space is obtained based on the calculated central position and the measured distance.

* * * * *